(12) United States Patent
Pinto et al.

(10) Patent No.: US 12,365,215 B2
(45) Date of Patent: *Jul. 22, 2025

(54) ELECTRIC VEHICLE HEAT PUMP USING ENHANCED VALVE UNIT

(71) Applicant: Tesla, Inc., Austin, TX (US)

(72) Inventors: Prem Pinto, San Jose, CA (US); Daniel F. Hanks, Palo Alto, CA (US)

(73) Assignee: Tesla, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/599,921

(22) Filed: Mar. 8, 2024

(65) Prior Publication Data
US 2024/0278617 A1 Aug. 22, 2024

Related U.S. Application Data

(63) Continuation of application No. 17/657,320, filed on Mar. 30, 2022, now Pat. No. 11,932,078.
(Continued)

(51) Int. Cl.
*B60H 1/00* (2006.01)
*B60H 1/08* (2006.01)

(52) U.S. Cl.
CPC ..... *B60H 1/00342* (2013.01); *B60H 1/00392* (2013.01); *B60H 1/00485* (2013.01); *B60H 1/08* (2013.01)

(58) Field of Classification Search
CPC ............ B60H 1/00342; B60H 1/00392; B60H 1/00485; B60H 1/00899; B60H 1/08;
(Continued)

(56) References Cited

U.S. PATENT DOCUMENTS

| 3,629,627 A | 12/1971 | Dafler et al. |
|---|---|---|
| 5,643,352 A | 7/1997 | Werth |

(Continued)

FOREIGN PATENT DOCUMENTS

| CN | 101578190 | 11/2009 |
|---|---|---|
| CN | 103079866 | 5/2013 |

(Continued)

OTHER PUBLICATIONS

"U.S. Appl. No. 17/657,320, Non Final Office Action mailed Aug. 4, 2023", 11 pgs.

(Continued)

*Primary Examiner* — Marc E Norman
(74) *Attorney, Agent, or Firm* — Schwegman Lundberg & Woessner, P.A.

(57) ABSTRACT

Systems, apparatuses, and methods for an enhanced heat pump are provided. An example embodiment includes a housing, the housing having a particular number of connection ports, each connection port being connected to a component of the electric vehicle, and the connection ports being configured to pass fluid; and a stemshell positioned within the housing, the stemshell comprising a plurality of channels, wherein at least a portion of the channels are in fluidic connection with the connection ports, wherein the stemshell is configured to rotate within the housing, and wherein rotation causes adjustment of the connection ports correspond which correspond to the channels.

20 Claims, 15 Drawing Sheets

Related U.S. Application Data

(60) Provisional application No. 63/200,874, filed on Mar. 31, 2021.

(58) Field of Classification Search
CPC ......... B60H 1/32284; F25B 2313/0274; F25B 2313/0276
See application file for complete search history.

(56) References Cited

U.S. PATENT DOCUMENTS

| | | |
|---|---|---|
| 6,191,511 B1 | 2/2001 | Zysset |
| 6,329,731 B1 | 12/2001 | Arbanas et al. |
| 6,360,835 B1 | 3/2002 | Skala |
| 6,394,207 B1 | 5/2002 | Skala |
| 7,156,195 B2 | 1/2007 | Yamagishi et al. |
| 7,789,176 B2 | 9/2010 | Zhou |
| 7,841,431 B2 | 11/2010 | Zhou |
| 8,232,319 B2 | 7/2012 | Kohno et al. |
| 8,448,696 B2 | 5/2013 | Johnston et al. |
| 8,970,075 B2 | 3/2015 | Rippel et al. |
| 9,306,433 B2 | 4/2016 | Sten et al. |
| 10,128,705 B2 | 11/2018 | Yang et al. |
| 10,587,162 B2 | 3/2020 | Yang et al. |
| 10,967,702 B2 | 4/2021 | Mancini et al. |
| 11,088,582 B2 | 8/2021 | Graves et al. |
| 11,218,045 B2 | 1/2022 | Yang et al. |
| 11,932,078 B2 | 3/2024 | Pinto et al. |
| 2002/0190598 A1 | 12/2002 | Bartman |
| 2003/0057783 A1 | 3/2003 | Melfi |
| 2004/0233592 A1 | 11/2004 | Oh et al. |
| 2005/0156471 A1 | 7/2005 | Kobayashi et al. |
| 2010/0001602 A1 | 1/2010 | Bossaller et al. |
| 2010/0127585 A1 | 5/2010 | Fee et al. |
| 2010/0320850 A1 | 12/2010 | Lemmers, Jr. et al. |
| 2011/0309697 A1 | 12/2011 | Kirkley, Jr. et al. |
| 2011/0309698 A1 | 12/2011 | Kirkley, Jr. et al. |
| 2012/0104884 A1 | 5/2012 | Wagner et al. |
| 2012/0153718 A1 | 6/2012 | Rawlinson et al. |
| 2012/0217756 A1 | 8/2012 | Balzer et al. |
| 2012/0299404 A1 | 11/2012 | Yamamoto et al. |
| 2013/0038182 A1 | 2/2013 | Obata et al. |
| 2013/0071057 A1 | 3/2013 | Fischer et al. |
| 2016/0023532 A1 | 1/2016 | Gauthier |
| 2016/0099633 A1 | 4/2016 | Yoshinori et al. |
| 2016/0209099 A1 | 7/2016 | Liu et al. |
| 2017/0152957 A1 | 6/2017 | Roche et al. |
| 2019/0024951 A1 | 1/2019 | Nishiyama et al. |
| 2019/0070924 A1 | 3/2019 | Mancini et al. |
| 2019/0118610 A1 | 4/2019 | Johnston et al. |
| 2019/0203981 A1 | 7/2019 | Akaiwa et al. |
| 2021/0331554 A1 | 10/2021 | Mancini et al. |
| 2022/0235870 A1 | 7/2022 | Knapper |
| 2022/0243828 A1 | 8/2022 | Svejcar et al. |
| 2022/0314735 A1 | 10/2022 | Pinto et al. |
| 2022/0316607 A1* | 10/2022 | Surve .................... F16K 27/065 |
| 2023/0304590 A1* | 9/2023 | Jönsson .............. F16K 11/0856 |

FOREIGN PATENT DOCUMENTS

| | | |
|---|---|---|
| CN | 204131349 | 1/2015 |
| CN | 204906069 | 12/2015 |
| CN | 108180212 | 6/2018 |
| DE | 4333613 | 4/1994 |
| DE | 102013020332 | 7/2014 |
| DE | 102013219186 | 3/2015 |
| EP | 1114939 | 7/2001 |
| EP | 2540552 | 1/2013 |
| EP | 2549626 | 1/2013 |
| EP | 2667486 | 11/2013 |
| EP | 2977254 | 1/2016 |
| GB | 2509308 | 7/2014 |
| JP | S56113223 | 9/1981 |
| JP | S6188467 | 5/1986 |
| JP | H0233569 | 3/1990 |
| JP | H10285876 | 10/1998 |
| JP | 2000316251 | 11/2000 |
| JP | 2001197705 | 7/2001 |
| JP | 2001238406 | 8/2001 |
| JP | 2006074930 | 3/2006 |
| JP | 2007300800 | 11/2007 |
| JP | 2008290636 | 12/2008 |
| JP | 4447410 | 4/2010 |
| JP | 2010172132 | 8/2010 |
| JP | 2011097784 | 5/2011 |
| JP | 2011166866 | 8/2011 |
| JP | 2011200038 | 10/2011 |
| JP | 2013027246 | 2/2013 |
| JP | 2013038998 | 2/2013 |
| JP | 2014082841 | 5/2014 |
| WO | 2012026044 | 3/2012 |
| WO | 2012176052 | 12/2012 |
| WO | 2013136405 | 9/2013 |

OTHER PUBLICATIONS

"U.S. Appl. No. 17/657,320, Response filed Oct. 30, 2023 to Non Final Office Action mailed Aug. 4, 2023", 7 pgs.
"U.S. Appl. No. 17/657,320, Notice of Allowance mailed Nov. 16, 2023", 7 pgs.
"U.S. Appl. No. 17/657,320, Corrected Notice of Allowability mailed Nov. 30, 2023", 2 pgs.
"U.S. Appl. No. 17/657,320, Corrected Notice of Allowability mailed Jan. 2, 2024", 2 pgs.

* cited by examiner

ELECTRIC VEHICLE HEAT PUMP USING ENHANCED VALVE UNIT

CROSS-REFERENCE TO RELATED APPLICATIONS

This application is a continuation of U.S. application Ser. No. 17/657,320 titled "ELECTRIC VEHICLE HEAT PUMP USING ENHANCED VALVE UNIT" and filed on Mar. 30, 2022 which claims priority to U.S. Prov. App. No. 63/200,874 titled "ELECTRIC VEHICLE HEAT PUMP USING ENHANCED VALVE UNIT" and filed on Mar. 31, 2021, the disclosure of which is hereby incorporated herein by reference in its entirety.

This application additionally hereby incorporates herein by reference U.S. Patent Pub. 2019/0070924, which is U.S. Pat. No. 10,967,702, in its entirety.

BACKGROUND

Technical Field

The present disclosure relates to heat pumps for use in automotive vehicles, and more particularly, to an enhanced valve unit usable to efficiently route and/or redirect coolant, structures having curved feature lines, and processes for forming the same.

Description of Related Art

Electric vehicles may commonly rely upon separate elements to perform the required cooling, heating, and so on, of various components included in the electric vehicles. For example, an electric vehicle may include a heating element for a heating, ventilation, and air conditioning unit (HVAC). The HVAC may utilize, for example, resistive heating to provide heat to the interior cabin of the vehicle. As another example, an electric vehicle may include a component utilized to cool the battery pack of the vehicle.

These disparate components may introduce substantial complexity when manufacturing the vehicle. Additionally, the components may introduce substantial complexity with respect to the operation of the vehicle and may consume substantial power.

Figure 1:
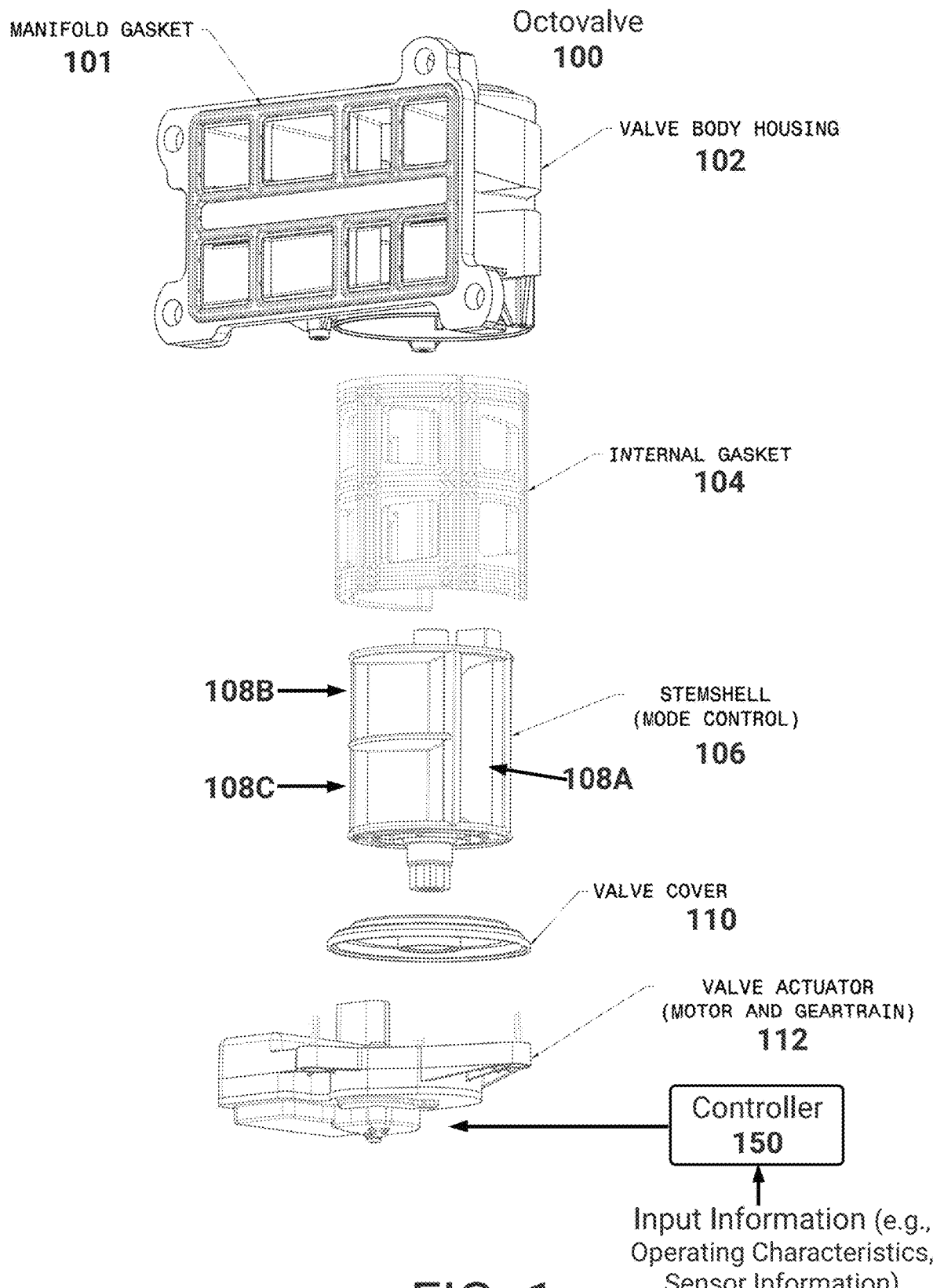
FIG. 1 illustrates example components included in an example octovalve used in an example heat pump as described herein.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

This application describes an enhanced valve (e.g., coolant valve) which forms part of a heat pump for a vehicle (e.g., an electric vehicle). The valve may include a number of ports, such as 6, 8, 10, 11, 12, and so on. In the examples described herein, the valve includes 8 ports and is referred to as an octovalve.

The above-described ports may be usable as either input ports or output ports. An input port may cause, as an example, a fluid to enter the octovalve. An output port may cause, as an example, a fluid to exit the octovalve. Example fluid may include coolant, such as a glycol/water mixture. As will be described, the octovalve may allow for a particular output port to be connected to a particular input port via a channel of the octovalve. For example, and as will be described in FIG. 4, a radiator and a chiller may be connected together. As another example described in FIG. 5, the radiator may be connected with itself. Thus, each input port of the octovalve may have a corresponding output port. As will be described, the octovalve may adjust which input port is connected with which output port.

The octovalve may have, as an example, fixed connections to disparate components of the vehicle. Example components may include a battery (e.g., a battery supply, a battery return), a chiller (e.g., a chiller pump, a chiller return), a powertrain pump which may be in communication with a powertrain (e.g., drive units) and a liquid chilled cooler (LCC), a radiator (e.g., a radiator supply, a radiator return), and so on. These fixed connections may be in a same plane, such that connections (e.g., hose connections) from the components to the octovalve may be oriented in a same direction. An example of this orientation is illustrated in FIG. 1. This type of integration would be impractical with a traditional coolant valve where all the ports are oriented radially in different directions. Thus, when manufacturing the vehicle each connection from a component may be simply plugged into a particular port of the octovalve.

The fixed connections may be separated into two levels. In some embodiments, there may be three, four, and so on, levels. Thus, each level may have four ports in the octovalve described herein. Each level may be associated with a particular height of the octovalve. As will be described, these fixed connections may be with respect to a housing of the octovalve (e.g., the valve body housing 102). The octovalve may additionally include an inner portion which includes a stemshell (e.g., the stemshell 106). In some embodiments, the stemshell may have 4 vertical channels and 2 horizontal channels. In other embodiments, a different number of vertical and horizontal channels may be used.

An example channel may represent a first fixed connection being connected with a second fixed connection. For this example, the first fixed connection may represent an input port while the second fixed connection may represent an output port. Thus, each channel may represent an input port being connected to an output port (e.g., coolant may flow through the channel). Depending on the desired configuration, ports can be connected in the vertical or horizontal directions. This configuration addresses, at least, the problem of asymmetry and crossing channels.

The above-described stemshell may be adjusted, for example via a controller, to alter the configuration of the channels. In some embodiments, the stemshell may be rotated about an axis to adjust the orientation of the channels with respect to the housing of the octovalve. Thus, different of the fixed connections may be connected, or otherwise be in fluidic communication, with each other. As the stemshell is rotated, the octovalve may therefore change which fixed connections are connected via respective channels.

Figure 3:
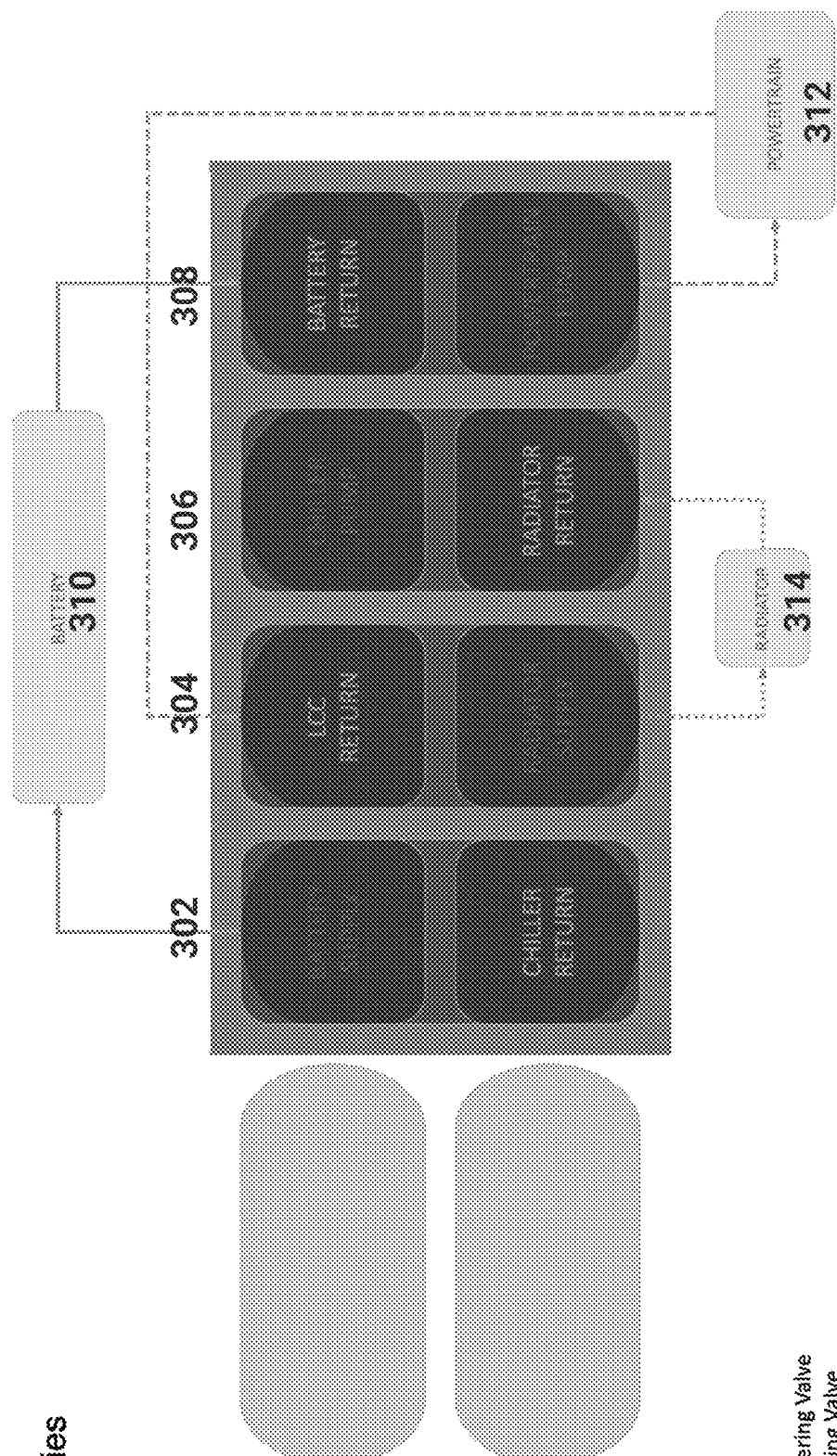
FIG. 3 illustrates a first example mode configured for implementation by the example octovalve.

The above-described adjustment of the channels may allow for different cooling and/or heating modes (referred to herein as heat pump modes). For example, FIG. 3 illustrates a full series mode in which a battery is connected to a powertrain (herein also referred to as a drive unit), in which the powertrain is connected to a radiator (e.g., via a liquid cooled condenser (LCC), in which the radiator is connected to a chiller, and in which the chiller is connected to the battery. As described above, connection may refer to coolant flowing between these connected components. Thus, this heat pump mode allows different components to be in series via use of the octovalve.

With respect to the components described above, as known by those skilled in the art a chiller may refer to a heat exchanger which exchanges heat between coolant and refrigerant. For example, the chiller may be a heat exchanger interface (e.g., a plate fin heat exchanger) which causes heat to move to refrigerant from coolant. An LCC may represent a heat exchanger which exchanges heat between refrigerant and coolant. In some embodiments, the LCC may be associated with the powertrain, such as being positioned subsequent to the powertrain (e.g., drive units) in a coolant loop (e.g., output of coolant from the powertrain goes into the LCC). Thus, the chiller may be in fluidic connection or communication with the LCC via a refrigerant loop.

As an example of the chiller and LCC described in more detail below, with respect to FIG. 10, heat from a battery may be extracted using coolant. The heated coolant may be provided to the above-described chiller which transfers heat to refrigerant. The coolant may be routed from the chiller back to the battery to extract more heat. The heated refrigerant may be provided to the LCC, which transfers heat to coolant. The heated coolant is provided to a radiator such that heat is extracted (e.g., expelled) from the coolant to ambient air.

Figure 4:
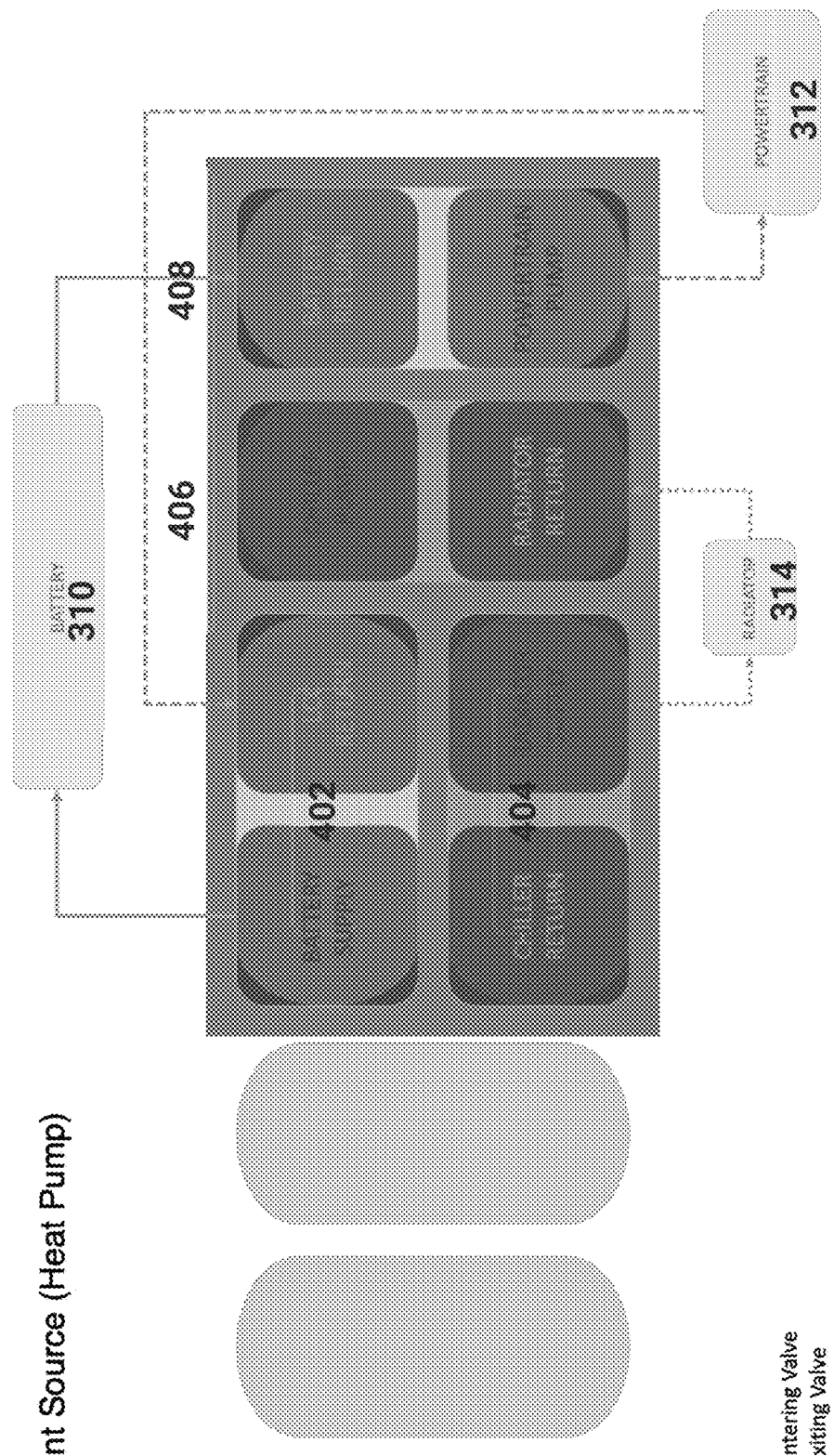
FIG. 4 illustrates a second example mode configured for implementation by the example octovalve.
Figure 15:
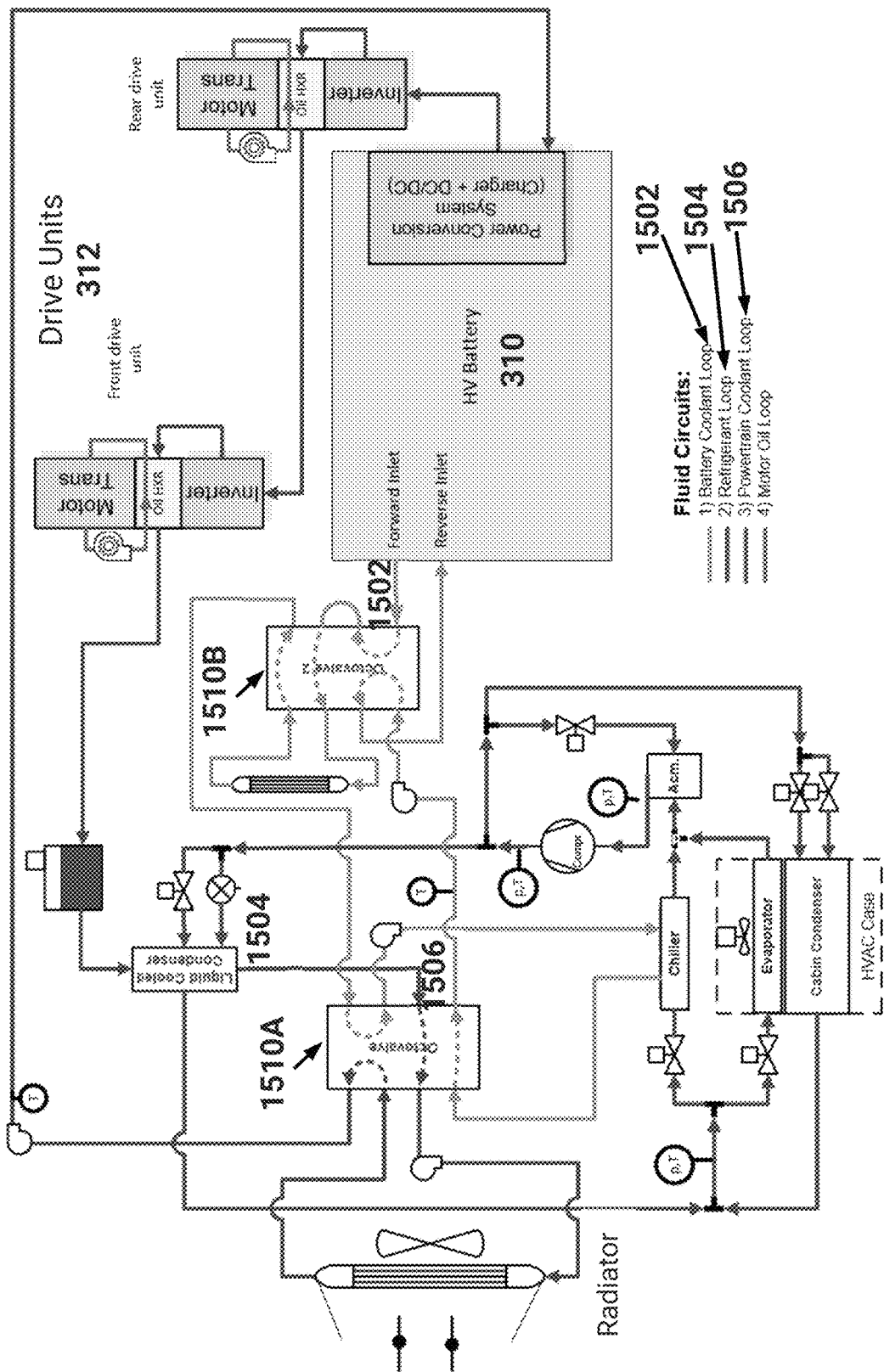
FIG. 15 illustrates an example embodiment which includes two octovalves.

As another example, FIG. 4 illustrates an ambient source mode. For this example, the radiator is connected to the chiller as a first loop. As described above, the chiller may transfer heat from coolant to refrigerant. Thus, heat may be extracted from air and transferred to refrigerant via the chiller while the coolant is cooled and recirculated to the radiator. The ambient source mode further includes a second loop in which the battery is connected to the powertrain. Heat from the heated refrigerant may be transferred to the coolant in the second loop via the LCC. The heated coolant may then flow into the battery to warm the battery (e.g., to precondition for charging, if the battery is cold such that range is affected, and so on). The heated refrigerant may also, in some embodiments, be provided to a heaving ventilation air conditioning (HVAC) unit (e.g., simultaneously provided). This may allow for ambient external air to be used to heat an interior cabin of the vehicle (e.g., without use, or with less use, of a resistive heating element). An example HVAC unit is illustrated in FIG. 15.

Figure 5:
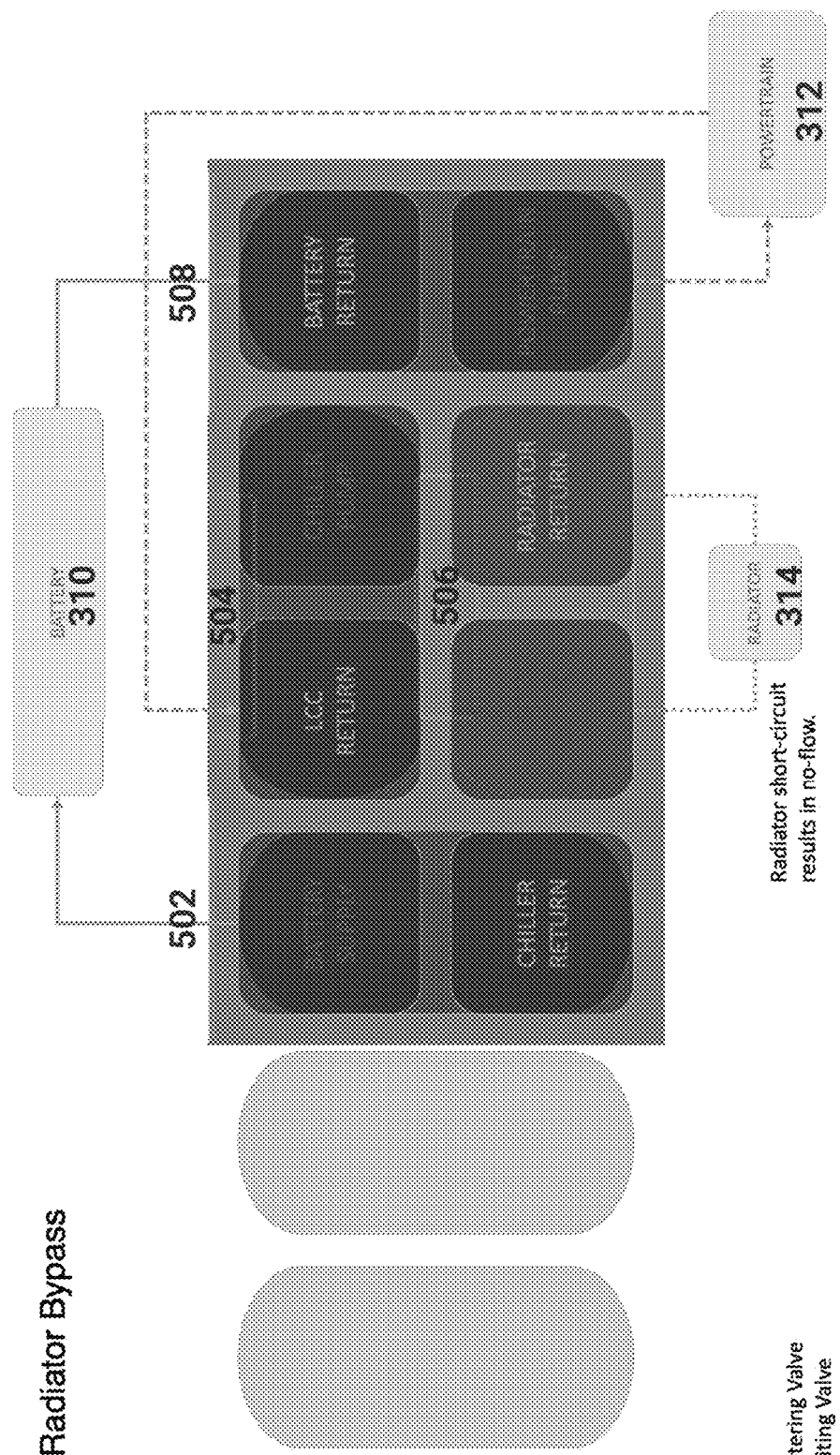
FIG. 5 illustrates a third example mode configured for implementation by the example octovalve.

FIG. 5 illustrates a series radiator bypass mode. This heat pump mode includes two loops, with a first loop connecting the radiator to itself. This may result in no, or little, fluid flow in a channel which is connected to an input of the radiator and an output of the radiator. A second loop of the series radiator bypass mode may connect the battery to the powertrain and to the chiller. Thus, instead of blocking off one of the ports to the radiator like earlier heat pumps, the stemshell causes the inlet and outlet of the radiator to directly connect to each other to create a closed loop. This closed loop may, as an example, have no driving pressure differential thereby preventing flow (e.g., preventing heat loss) through the radiator. Other approaches to radiator bypass functionality may have required an additional port, or a larger and more complex stemshell.

Figure 6:
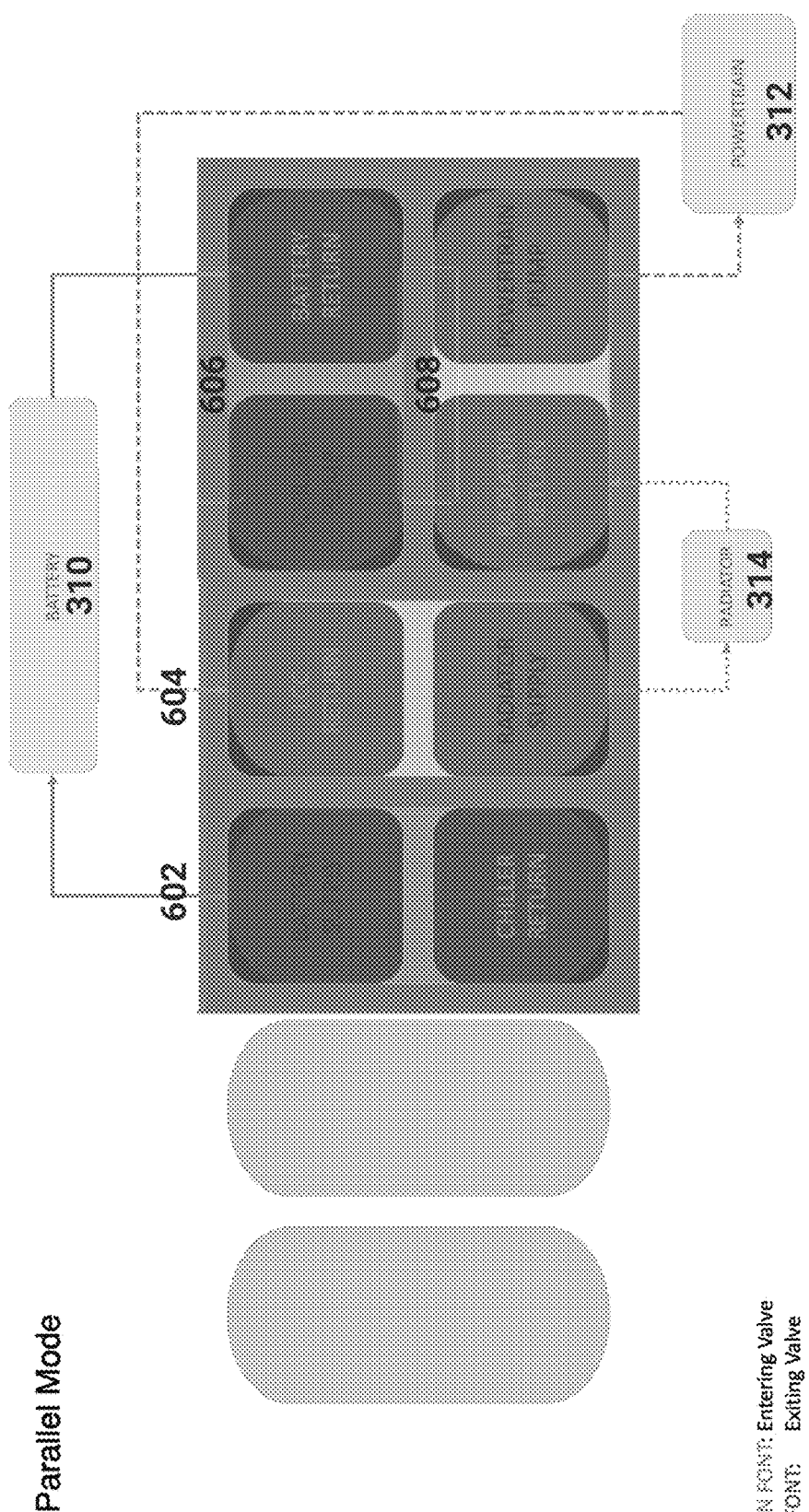
FIG. 6 illustrates a fourth example mode configured for implementation by the example octovalve.

FIG. 6 illustrates a parallel mode. This heat pump mode includes two loops, with a first loop connecting the radiator and powertrain. A second loop of the parallel mode may connect the battery and chiller.

Figure 7:
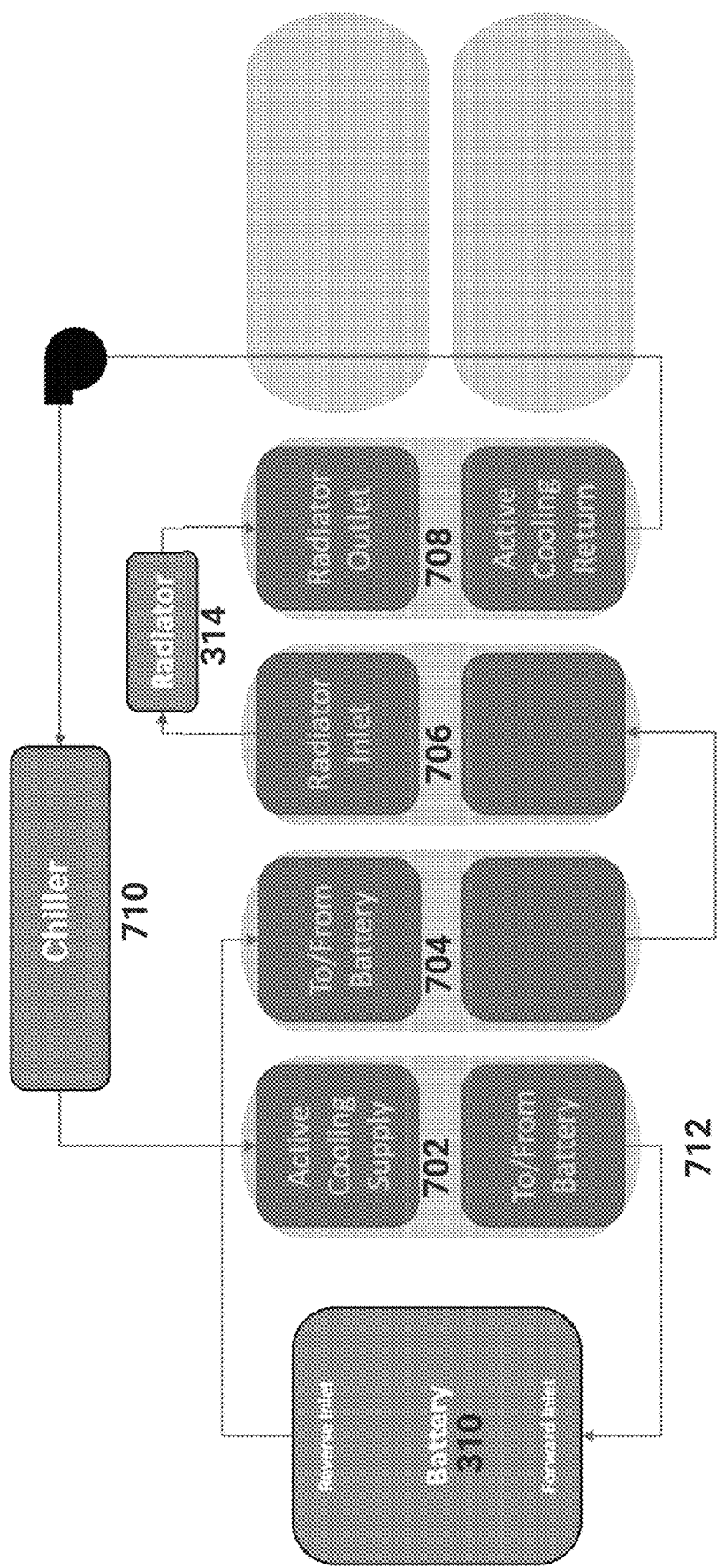
FIG. 7 illustrates a fifth example mode configured for implementation by the example octovalve.
Figure 8:
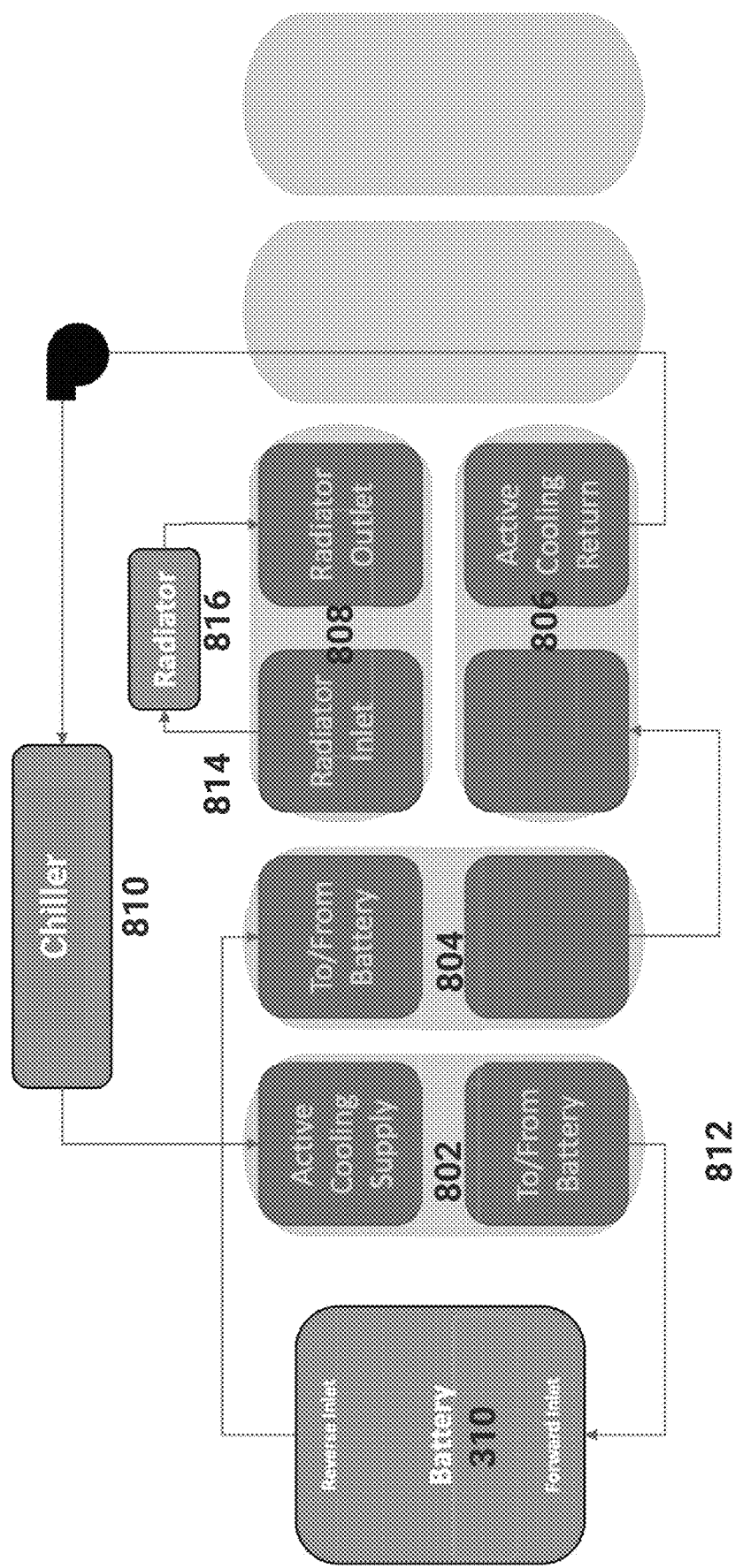
FIG. 8 illustrates a sixth example mode configured for implementation by the example octovalve.
Figure 9:
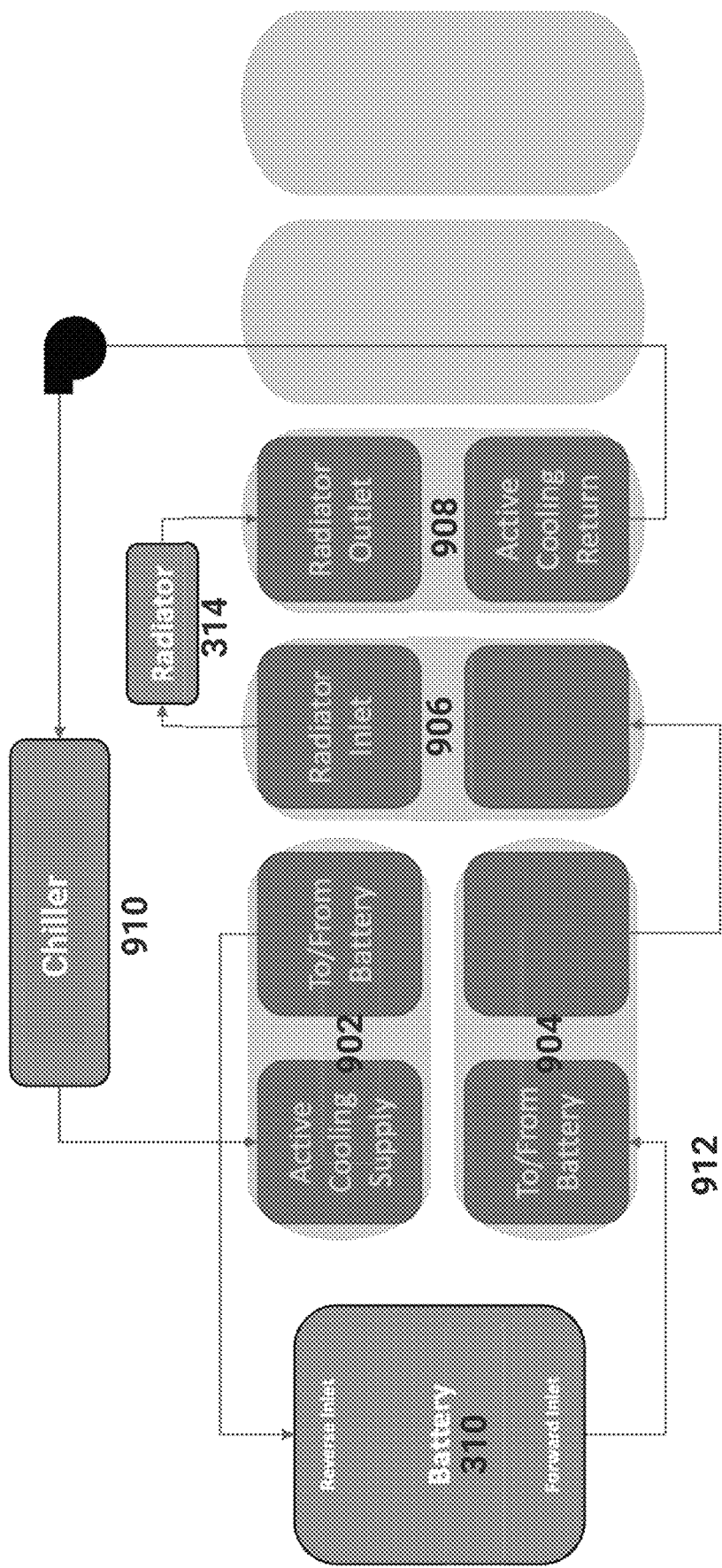
FIG. 9 illustrates a seventh example mode configured for implementation by the example octovalve.

FIGS. 7-9 describe different techniques for performing battery flow reversal, optionally with bypassing a radiator. For example, these modes may be sub-modes. FIGS. 10-12 describe different techniques for performing battery flow reversal, optionally with bypassing a drive unit. For example, these modes may be sub-modes.

With respect to FIGS. 7-12, flow reversal may be used to reduce temperature gradients inside a battery. For example, when the battery is being cooled (e.g., during charging or use), battery cells proximate to the inlet may be colder than battery cells proximate to the outlet of the battery. That is, coolant will be warmed while cooling battery cells within the battery (e.g., in a direction from the inlet to the outlet). As may be appreciated, charging of the battery may be more efficient with substantially uniform battery cell temperature. Reversing the flow direction may be equivalent to doubling the coolant flowrate which, without the techniques described herein, may require additional elements (e.g., pumps and more pumping energy, larger coolant hoses, more mass, and so on).

Figure 10:
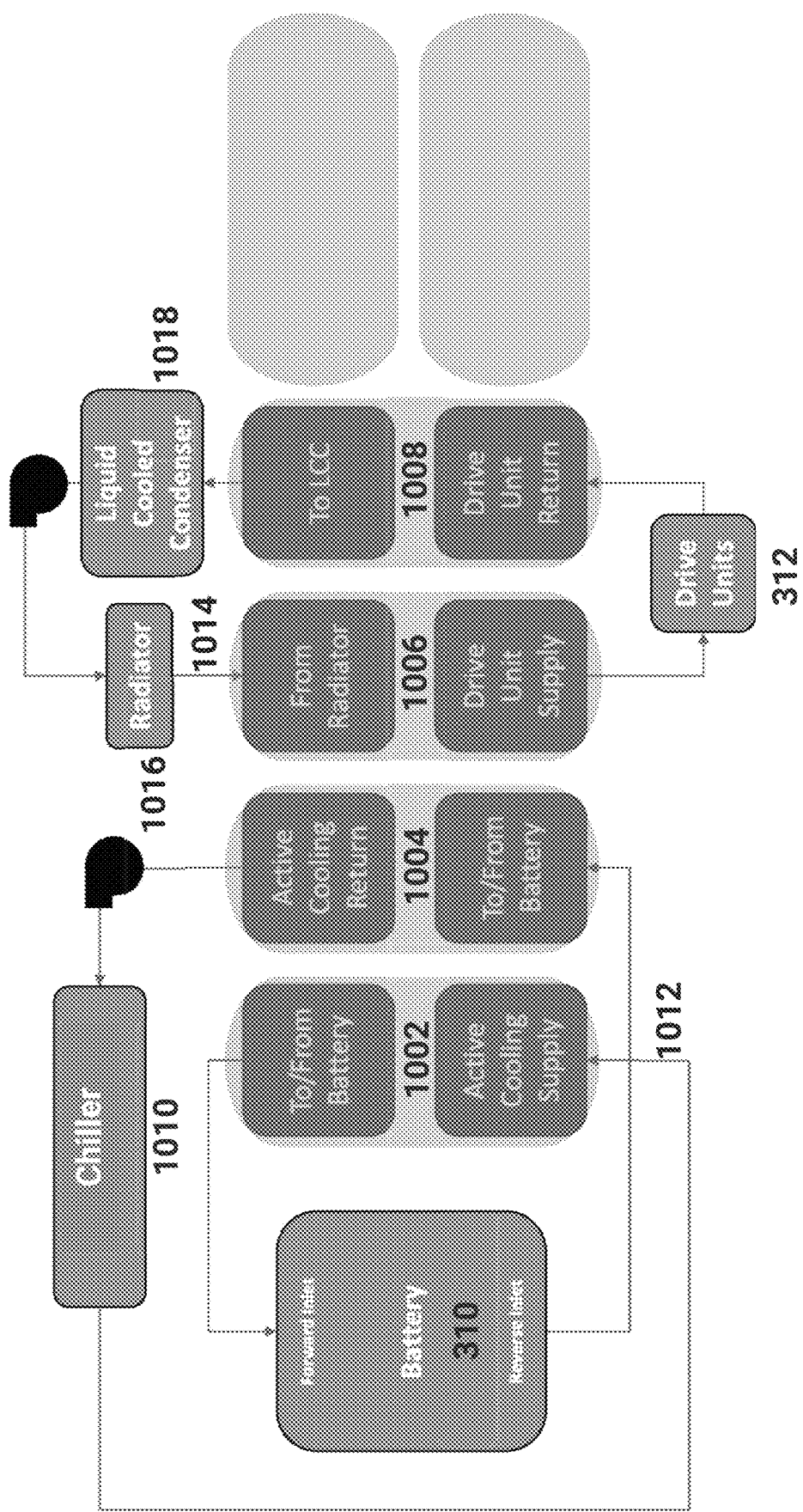
FIG. 10 illustrates an eighth example mode configured for implementation by the example octovalve.
Figure 11:
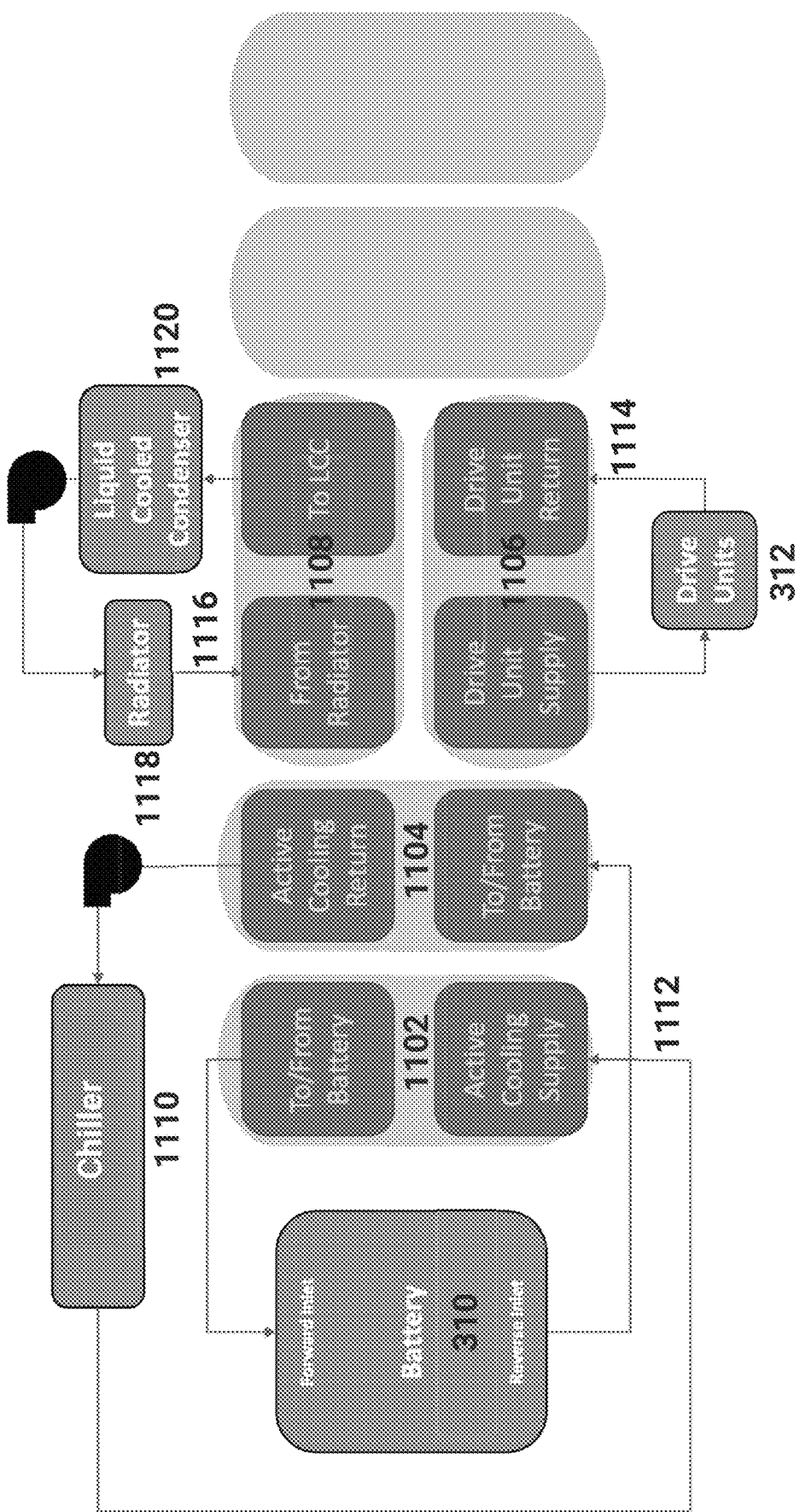
FIG. 11 illustrates a ninth example mode configured for implementation by the example octovalve.
Figure 12:
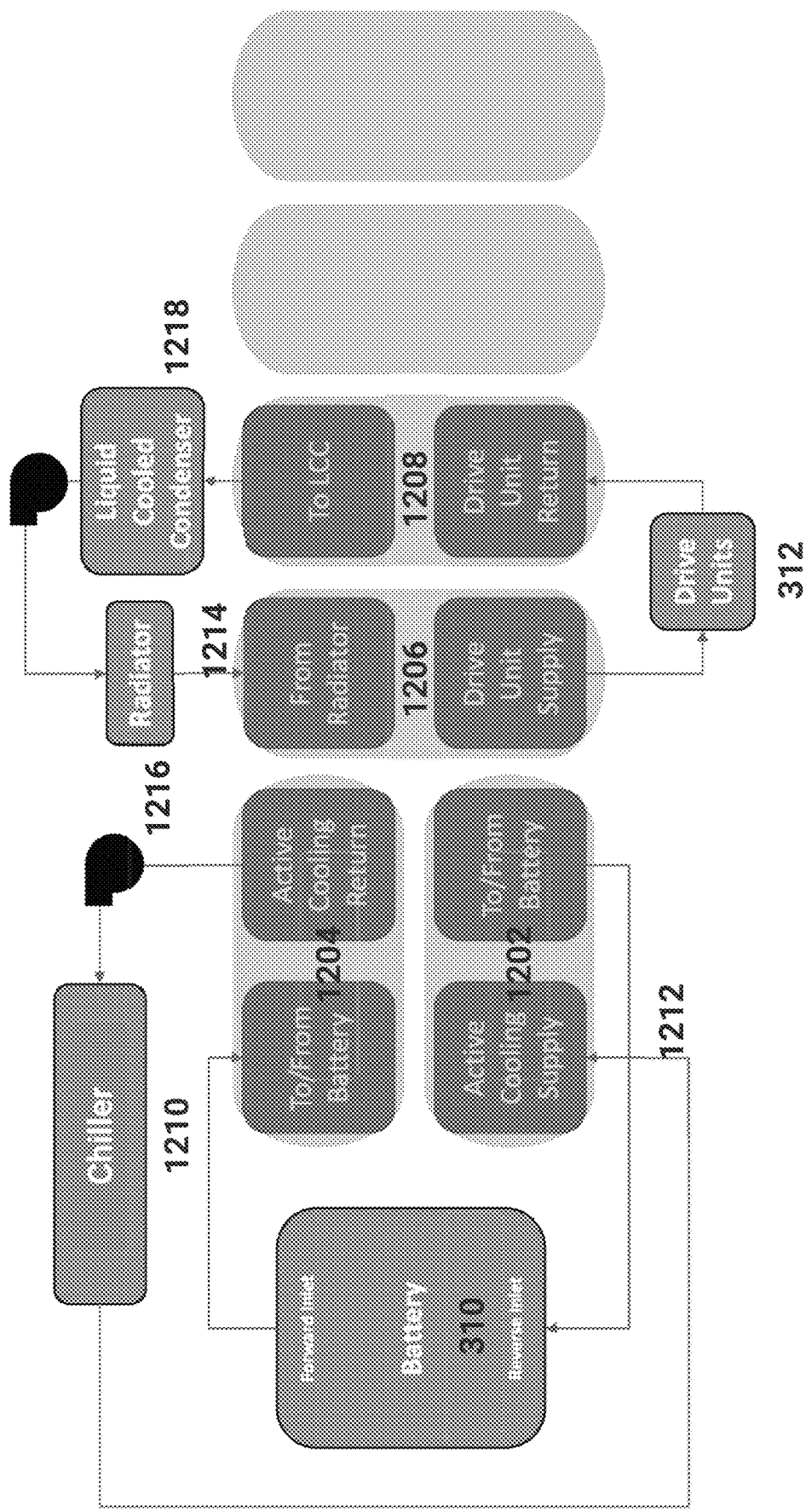
FIG. 12 illustrates a tenth example mode configured for implementation by the example octovalve.

FIGS. 7-9 describe, as an example, cooling of the battery while FIGS. 10-12 describe, as an example, cooling both the battery and drive units (herein also referred to as the powertrain). Thus, depending on the temperature of the battery and/or drive units, just the battery or the battery and the drive unit may be cooled. For example, if the drive units are greater than a threshold temperature then a controller may select one of the modes described in FIGS. 10-12.

For FIGS. 10-12, which relate to drive unit bypass, the drive units may be inactive during charging (e.g., fast charging). However, they may be a flow impedance for other elements, such as the radiator, liquid cooled condenser, and so on. As an example, certain modes may cause one or more loops to include the drive units. Bypassing the drive units may increase coolant flow to other elements, such as the radiator and liquid cooled condenser, which improves heat transfer performance. In contrast, increasing cooling flow with more pumps, larger coolant hoses, and so on, is costly and more complex. Additionally, such techniques require more pumping energy and more mass (e.g., reducing, at least, range of an electric vehicle).

In this way, the techniques described herein improve upon prior heat pumps and stemshells. For example, and in contrast to the three-dimensional stemshell described herein, a prior stemshell may have been formed a single plane. These 2D versions may require the stemshell diameter to grow with each added port. Furthermore, achievable configurations (e.g., which ports are connected) may be limited to basic repeatable/symmetric patterns to avoid having channels cross over each other. Due to the complexity of the octovalve functionality described herein, and due to asymmetric nature of the connections, these 2D versions would be impractical.

In some embodiments, the stemshell may represent a continuous element or part. For example, the stemshell may be formed from plastic or metal. In some embodiments, the stemshell may be 3D printed.

These, and other, details will now be described in more detail below.

FIG. 1 illustrates example components included in an example octovalve 100 used in an example heat pump as described herein. The octovalve 100 includes a valve body housing 102 which has eight connection ports (e.g., connected via the manifold gasket 101). Each of the connection ports are oriented in a same direction, such that connections from different components may be easily made. Additionally, the octovalve may utilize less space. Additionally, the eight connection ports are separated vertically into two groups of four connections ports.

Within the valve body housing 102 an internal gasket 104 and stemshell 106 may be used. As illustrated, the internal gasket 104 may be used as a seal between the valve body housing and stemshell 106. The stemshell 106, as described above, may allow for adjustment of heat pump modes. For example, the stemshell 106 includes a first channel 108A which is oriented in a vertical direction. In this example, the first channel 108A may connect a first connection port of the valve body housing 102 with a second connection port of the valve body housing 102. The first connection port and second connection port may be from different vertical groups (e.g., the first connection port may be from an upper group of four connections ports and the second connection port may be a lower group of four connection ports).

A second channel 108B and a third channel 108C are also illustrated in FIG. 1. These channels 108B-108C may be horizontal channels. For example, second channel 108B may connect a first connection port of the valve body housing 102 with a second connection port. In this example, the first connection port and second connection port may be included in a same vertical group. For example, the connection ports may in the upper or lower group of four connection ports.

The octovalve 100 further includes a valve cover 110 and valve actuator 112. These may be in contact with a lower portion of the stemshell 106. The valve actuator 112 may cause rotation of the stemshell about a vertical axis, such that an orientation of the stemshell 106 with respect to the valve body housing 102. For example, the stemshell 106 may rotate within the housing 102. As may be appreciated, the adjustment in rotation may change which vertical and/or horizontal channels are in fluidic communication or contact with the eight connection ports.

Thus, the adjustment in rotation may allow for different combinations of the eight connection ports to be connected together. For example, a first connection port may represent an input from a radiator. As another example, a second connection port may represent an output into the radiator. As another example, a third connection port may represent an input from a chiller while a fourth connection port may represent an output into the chiller. The stemshell may be rotated such that the first connection port and second connection port are connected to a same channel (e.g., as illustrated in FIG. 5). The stemshell may also be rotated such that the first connection port is connected to the fourth connection port while the second connection port into the third connection connect port. This example is illustrated in FIG. 4 and may be used to heat batteries of a vehicle.

In some embodiments, the example heat modes described herein may be effectuated via adjusting the stemshell included in the octovalve. In some embodiments, a portion of the example heat modes may be effectuated via adjusting the stemshell and other heat modes may be effectuated via connecting different components, or a different connection order, to the fixed connections. Thus, and as an example, the heat modes described herein (e.g., FIGS. 3-6) may be effectuated via adjusting the orientation of the stemshell (e.g., rotation the stemshell) while other heat modes may represent example embodiments which the octovalve is configured to enable.

FIG. 1 further illustrates a controller 150 which may cause adjustment of the stemshell 106. For example, the controller may represent a processor, ASIC, and so on, which may leverage input information to adjust the stemshell 106. Example input information may include operating parameters (e.g., whether the vehicle is charging, in a particular drive mode), sensor information (e.g., temperature information of internal components, an external air temperature), and so on. The controller may determine whether to adjust a current heat pump mode. For example, the controller 150 may determine that a vehicle is going to charge and may select a heat pump mode associated with preconditioning a battery of the vehicle. As another example, the controller 150 may determine that the drive unit is to be chilled based on a temperature of the drive unit exceeding a threshold. As another example, the controller 150 may determine that a flow rate associated with cooling the battery is to be increased and may select a mode which bypasses the radiator and/or drive units (e.g., as described in FIGS. 7-12).

Figure 2:
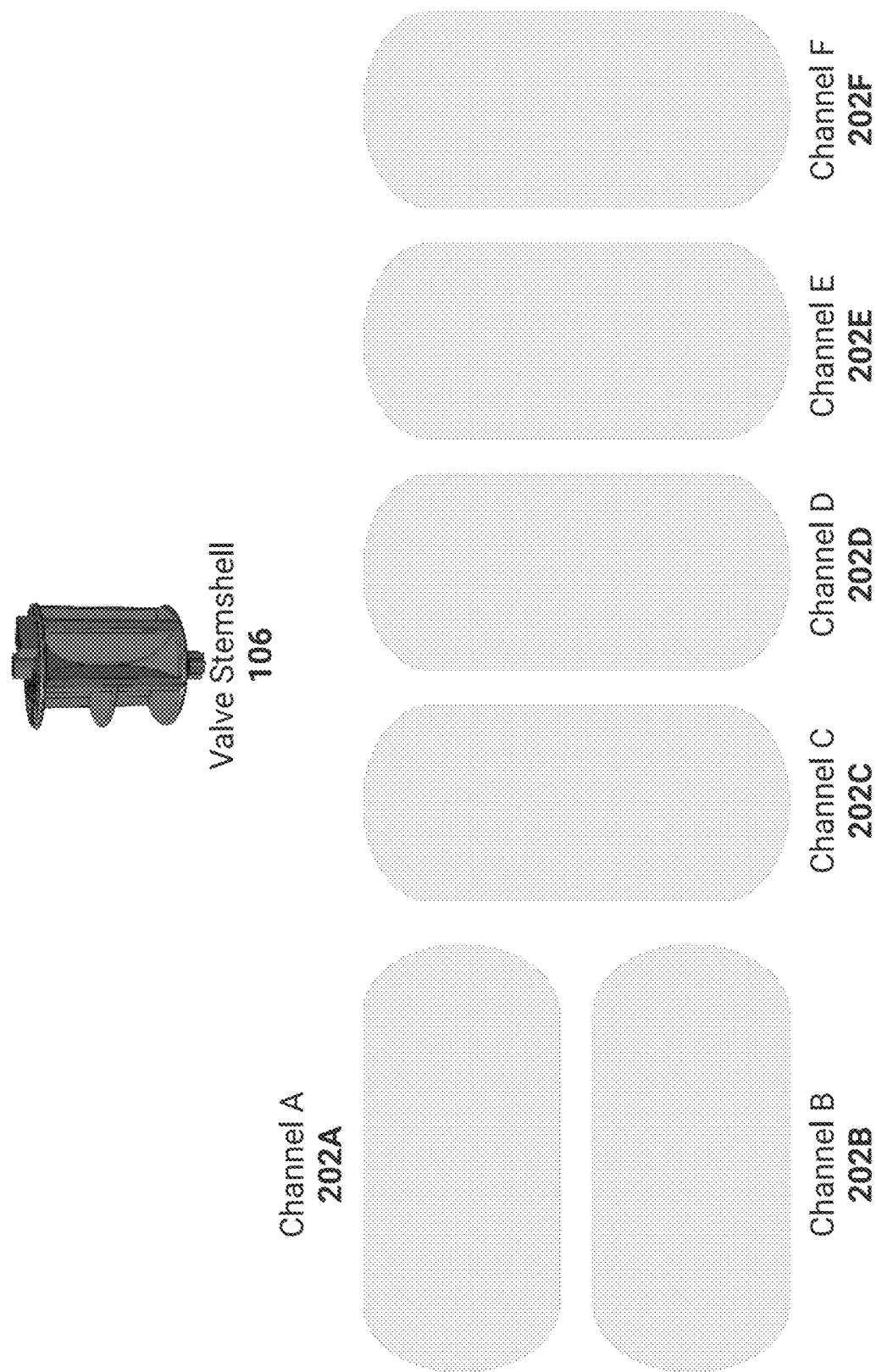
FIG. 2 illustrates an example valve stemshell included in the example octovalve.

FIG. 2 illustrates an example valve stemshell 106 included in the example octovalve. The illustrated example includes an indication of channels 202A-202F which may be implemented by the stemshell 106. For example, the channels 202A-202F may represent the stemshell 106 unrolled to illustrate example vertical and/or horizontal channels which may be utilized. In this example, there are two horizontal channels 202A-202B and four vertical channels 202C-202F.

In some embodiments, four of the channels 202A-202F may be active at one time. In some other embodiments, all six 202A-202F may be active at one time. Examples of heat pump modes which may be implemented via adjustment (e.g., rotation) of the stemshell 106 are described below with respect to FIGS. 3-6.

The heat pump modes described herein represent example modes which may be effectuated. In some embodiments, the octovalve 100 may represent the eight-way valve described in U.S. Patent Pub. 2019/0070924, which is hereby incorporated herein by reference and forms part of this disclosure as if set forth herein. The octovalve 100 may implement or otherwise be associated with, all or a subset, of the different modes described in U.S. Patent Pub. 2019/0070924.

FIG. 3 illustrates a first example mode configured for implementation by the example octovalve. In the illustrated example, four vertical channels are active. As an example, the stemshell 106 may be rotated such that the four vertical channels are in fluidic connection or communication with eight connection ports of the valve body housing 102.

A first vertical channel 302 may have an input from a chiller (e.g., the output of the chiller may be input to the channel 302) and then output into a battery supply (e.g., the output of channel 302 may be provided as an input into battery 310). As described above, the chiller may exchange heat from coolant into refrigerant, such that the input to the first vertical channel 302 receives cooled coolant (e.g., as compared to the coolant prior to the chiller). The output of the battery 310 may then be provided as an input into a fourth vertical channel 308. The output of the fourth vertical channel 308 may be provide as an input into a powertrain 312. The output of the powertrain 312 may then be provided as an input into second channel 304 via a liquid chilled cooler (LCC). As described above, the LCC may exchange heat between refrigerant and coolant, such that the coolant from the LCC may be heated.

The output of the second channel 304 may be provided as an input to radiator 314. As may be appreciated, the radiator 314 may exchange heat with ambient air outside the vehicle thus removing heat from the coolant. The output of the radiator 314 may then be provided as an input into third channel 306 and an output of the third channel 306 may be provided as an input into a chiller. As described above, the chiller may cool the coolant by exchanging heat with the above-described refrigerant. The output of the chiller may then be provided to the first vertical channel 302 as an input, thus completing the loop.

In this way, disparate components of a vehicle may be connected together in series.

FIG. 4 illustrates a second example mode configured for implementation by the example octovalve. For this example mode, two horizontal channels 402-404 and two vertical channels 406-408 of the stemshell 106 are utilized. Thus, two vertical channels are not active. The second example mode may be used to extract heat from the external air and use it, as an example, for heating an interior of a cabin.

A first channel 402 may have an input from an output of a liquid chilled cooler (LCC). Thus, the output from the LCC may represent coolant heated from refrigerant (e.g., a refrigerant loop, as described above). The first channel 402 may have an output which is provided as an input into battery 310. Thus, the battery may be heated via the heated coolant. A fourth channel 408 may then receive an output from battery 310 as an input into the channel 408. An output of the channel 408 may then be provided as an input to powertrain 312. The output of the powertrain 312 may be provided to an input of the LCC, and the output of the LCC may be provided as an input back to the first channel 402. Thus, the powertrain may be in series with the LCC. This represents a first loop of the second example mode.

A second channel 404 may be input fluid from an output of a chiller. As described above, the chiller may transfer heat from coolant to refrigerant. For example, the refrigerant may be heated and used by the LCC to provide heat to the first loop described above. The output of the second channel 404 may be provided as an input into a radiator 314. Since the coolant being input to the radiator 314 is cooled via the chiller, the radiator 314 will cause ambient air to heat the coolant. The output of the radiator 314 may then be provided as an input into the chiller via third channel 406. The output of the chiller may be provided back to second channel 404. This represents a second loop of the second example mode.

As may be appreciated, the chiller may transfer heat from coolant into refrigerant. In contrast the LCC may transfer heat from refrigerant into coolant. With respect to the second example mode, the radiator is being used to transfer heat from an external environment. For example, the coolant is below ambient temperature such that it pulls heat from the air. This heat is then routed to the chiller which transfers heat from the coolant into the refrigerant, such that the coolant is chilled. The refrigerant is then used by the LCC to heat coolant which flows into the battery. The coolant is routed back to the radiator as a sub-ambient temperature, such that it can continue to pull heat from the external environment.

FIG. 5 illustrates a third example mode configured for implementation by the example octovalve. The third mode utilizes an orientation of the stemshell 106 in which two vertical channels 502 and 508, and two horizontal channels 504-506, are active. Two vertical channels are inactive in the illustrated example.

Similar to the FIG. 4, there are two active loops for the third example mode. With respect to the first loop, first channel 502 has an input which represents an output from a chiller. Thus, input to the first channel 502 may represent coolant which has been, at least in part, cooled by the chiller. The output of the first channel 502 is provided as an input to battery 310. The output of the battery 310 is then provided as an input to fourth channel 508. The output of the fourth channel 508 is provided as an input into powertrain 312. The output of powertrain 312 is provided via an LCC as an input to second channel 504. The output of second channel 504 is then provided as an input into the chiller. The output of the chiller is then provided to first channel 502, thus completing the first loop.

The second loop utilizes third channel 506. As illustrated, the output of the radiator 314 is provided to third channel 506. Additionally, the output of third channel 506 is provided as an input to the radiator 314. This completes the second loop. Since the radiator 314 may, as an example, be short-circuited there may be no fluid flow.

FIG. 6 illustrates a fourth example mode configured for implementation by the example octovalve. The illustrated example fourth mode includes use of two vertical channels 602-604 and two horizontal channels 606-608. Thus, there are two vertical channels which are not active in this example. Additionally, there are two loops illustrated in FIG. 6.

With respect to a first loop, a first channel 602 has an input which represents an output from a chiller. The output of the first channel 602 is provided as an input to battery 310. The output of the battery 310 is then provided as an input into third channel 606. The output of third channel 606 is provided as an input into the chiller. The output of the chiller is then provided back to first channel 602, thus completing the first loop. In this way, the fourth example mode may be used to cool the battery.

With respect to a second loop, an input into second channel 604 represents an output of an LCC. The output of the second channel 604 is provided as an input into radiator 314. The output of radiator 314 is provided as an input into fourth channel 608. The output of fourth channel 608 is provided as an input into powertrain 312. The output of powertrain 312 is provided to an input of the LCC, such that the output of the LCC is provided as an input into second channel 604. Thus, the second loop uses the radiator to transfer heat to ambient air (e.g., outside the vehicle). The heat may be from the powertrain. The heat may also be heat transferred to refrigerant by the chiller.

In some embodiments, FIGS. 7-9 may describe an octovalve in which a liquid cooled condenser and drive units are not connected as fixed connections. In some embodiments, FIGS. 7-9 may describe use of two octovalves in which the figures illustrate connections for one of the octovalves. For example, FIGS. 7-9 may relate to loop 1502 illustrated in FIG. 15.

FIG. 7 illustrates a fifth example mode configured for implementation by the example octovalve. The illustrated example fifth mode includes use of four vertical channels 702-708. Thus, there are two horizontal channels which are not active in this example. Additionally, there is one loop 712 illustrated in FIG. 7.

With respect to the loop 712, a first channel 702 has an input which represents an output from a chiller 710 (e.g., an active cooling supply). The output of the first channel 702 is provided as an input to a battery 310 (e.g., an input to the forward inlet of the battery 310). For example, the loop 712 illustrated in FIG. 7 may be reversed to ensure consistent temperature gradients across battery cells of the battery 310. In this example, the loop 712 may be reversed periodically (e.g., during charging) such as every 30 seconds, one minute, and so on. The reversed loop is illustrated in FIG. 9 and described below.

Channel 704 is connected to the battery, which may be an input into channel 704, such as in FIG. 7, or an output from channel 704, such as in FIG. 9, depending on whether loop 712 is being reversed. Channel 704 is also connected to channel 706 via a connection, such as a hose which routes coolant between channels. For example, the fixed connections to the octovalve may include a hose which connects to two fixed connections. In this example, the above-described stemshell may be rotated such that the hose patches, or connects, two ports of different channels. Thus, channel 706 is connected to channel 704 such that the battery output (e.g., from the reverse inlet) is connected to radiator inlet of the radiator 314.

Channel 708 is connected to the radiator 318 such that the radiator inlet of channel 706 is an input into channel 708. Thus, the output of the radiator 314 flows into the channel 708 as an input and into the chiller 710. The output of channel 708 thus is connected to the chiller 710, with the output of the chiller 710 being connected to channel 702 thus completing the loop.

FIG. 8 illustrates a sixth example mode configured for implementation by the example octovalve. The illustrated example sixth mode includes use of two vertical channels 802-804 and two horizontal channels 806-808. Thus, there are two vertical channels which are not active in this example. Additionally, there are two loops 812-814 illustrated in FIG. 8.

FIG. 8 may be used (e.g., selected by the controller described herein) to avoid leaking heat from the battery to ambient air when the battery is being heated. Additionally, FIG. 8 may be used to avoid leaking heat from ambient air to the battery when cooling the battery.

The first loop 812 includes channel 802 having an input which represents an output from chiller 810 (e.g., an active cooling supply). The output of the first channel 802 is provided to the battery 310. Channel 804 is connected to battery 310 and may receive the output of the battery 310. As described in FIG. 8, channel 804 is connected to channel 806 via a hose or patch. Thus, coolant does not flow through an exterior element (e.g., a radiator, chiller, battery, LCC, and so on as described herein) but rather flows directly to another channel. Channel 806 outputs to chiller 810 as an input, and the output of chiller 810 is provided to channel 802 thus completing the first loop 812.

The second loop 814 connects the radiator 816 inlet and outlet via channel 808. In this way, there may be no, or substantially no, pressure differential. Thus, coolant flow may be substantially limited or zero.

FIG. 9 illustrates a seventh example mode configured for implementation by the example octovalve. The illustrated example seventh mode includes use of two horizontal channels 902-904 and two vertical channels 906-908. Thus, there are two vertical channels which are not active in this example. Additionally, there is one loop 912 illustrated in FIG. 9.

The loop 912 includes channel 902 receiving output from 910 as input to the channel 902. The channel 902 is connected to battery 310, and battery 310 is connected to channel 904. This channel includes a hose or patch connecting it to channel 906 which is connected to radiator 314. For example, channel 906 provides input to the radiator 314, and the output of the radiator 314 is provided to channel 908. This channel is connected to the chiller 910, such that the output of channel 908 is provided as input to chiller 910. The output of chiller 910 is then provided to channel 902 thus completing the loop.

FIG. 10 illustrates an eighth example mode configured for implementation by the example octovalve. The illustrated example eighth mode includes use of four vertical channels 1002-1008. Thus, there are two horizontal channels which are not active in this example. Additionally, there are two loops 1012-1014 illustrated in FIG. 10.

The first loop 1012 includes channel 1002 receiving input from an output of chiller 1010 (e.g., a heat exchanger as described above). Channel 1002 is connected to battery 310, and in this example, coolant flows into battery 310. Output from battery 310 is provided as an input to channel 1004 which is connected to chiller 1010. For example, the output of channel 1004 is provided as input to chiller 1010. Therefore, this channel cools the battery using active cooling.

The second loop 1014 includes channel 1006 receiving input from an output of radiator 1016. Channel 1006 is connected to the drive units 312, such that the output of radiator 1016 is provided as input to the drive units 312. Channel 1008 receives input from an output of the drive units 312, and channel 1008 is connected to the liquid cooled condenser 1018 (LCC) described herein. Thus, output of channel 1008 is provided as input to the LCC 1018, and output of the LCC 1018 is routed as input to radiator 1016. In this way, and as an example, heat may be expelled to ambient air. Channel 1006 then receives input from the output of the radiator 1016 completing the second loop 1014.

FIG. 11 illustrates a ninth example mode configured for implementation by the example octovalve. The illustrated example ninth mode includes use of two vertical channels 1102-1104 and two horizontal channels 1106-1108. Thus, there are two vertical channels which are not active in this example. Additionally, there are three loops 1112-1116 illustrated in FIG. 11. In FIG. 11, the drive units 312 are thus bypassed in loop 1114 such that the flow rate of coolant may be increased in loop 1116 due to a lower pressure restriction (e.g., as compared to FIG. 10).

The first loop 1112 includes an output of the chiller 1110 being provided as input to channel 1102. This channel is connected to the battery 310, such as the input to the battery 310. Channel 1104 receives output of the battery 310 as input to the channel. This channel 1104 is connected to the chiller 1110, such that output of the channel 1104 is provided as input to the chiller 1110. The output of the chiller 1110 is then provided as input to channel 1102 thus completing the first loop.

The second loop 1114 includes output of the drive units 312 being provided as input to channel 1106. The output of channel 1106 is provided as input to the drive units 312. In this way, there may be limited pressure differential such that limited, or no, coolant flows in this channel 1106.

The second loop 1116 includes output of the radiator 1118 being provided as input to channel 1108. The output of channel 1108 is provided as input to the LCC 1120, and the output of the LCC 1120 is provided to the radiator 1118.

FIG. 12 illustrates a tenth example mode configured for implementation by the example octovalve. The illustrated example tenth mode includes use of two horizontal channels 1202-1204 and two vertical channels 1206-1208. Thus, there are two vertical channels which are not active in this example. Additionally, there are two loops 1212-1214 illustrated in FIG. 12.

FIG. 12 may represent a reverse flow of FIG. 10. In some embodiments, the flow may be reversed periodically (e.g., during charging) such as every 30 seconds, one minute, and so on.

The first loop 1212 includes channel 1202 receiving input from an output of chiller 1210. Channel 1202 is connected to battery 310, and in this example, coolant flows into battery 310 via a reverse inlet (e.g., opposite to that of FIG. 10). Output from battery 310 (e.g., a forward inlet) is provided as an input to channel 1204 which is connected to chiller 1210. For example, the output of channel 1204 is provided as input to chiller 1210. Therefore, this channel cools the battery using active cooling.

The second loop 1214 includes channel 1206 receiving input from an output of radiator 1216. Channel 1206 is connected to the drive units 312, such that the output of radiator 1216 is provided as input to the drive units 312. Channel 1208 receives input from an output of the drive units 312, and channel 1208 is connected to the liquid cooled condenser 1218 (LCC) described herein. Thus, output of channel 1208 is provided as input to the LCC 1218, and the output of the LCC 1218 is routed as input to radiator 1216. Channel 1206 then receives input from the output of the radiator 1216 completing the second loop 1214.

Figure 13:
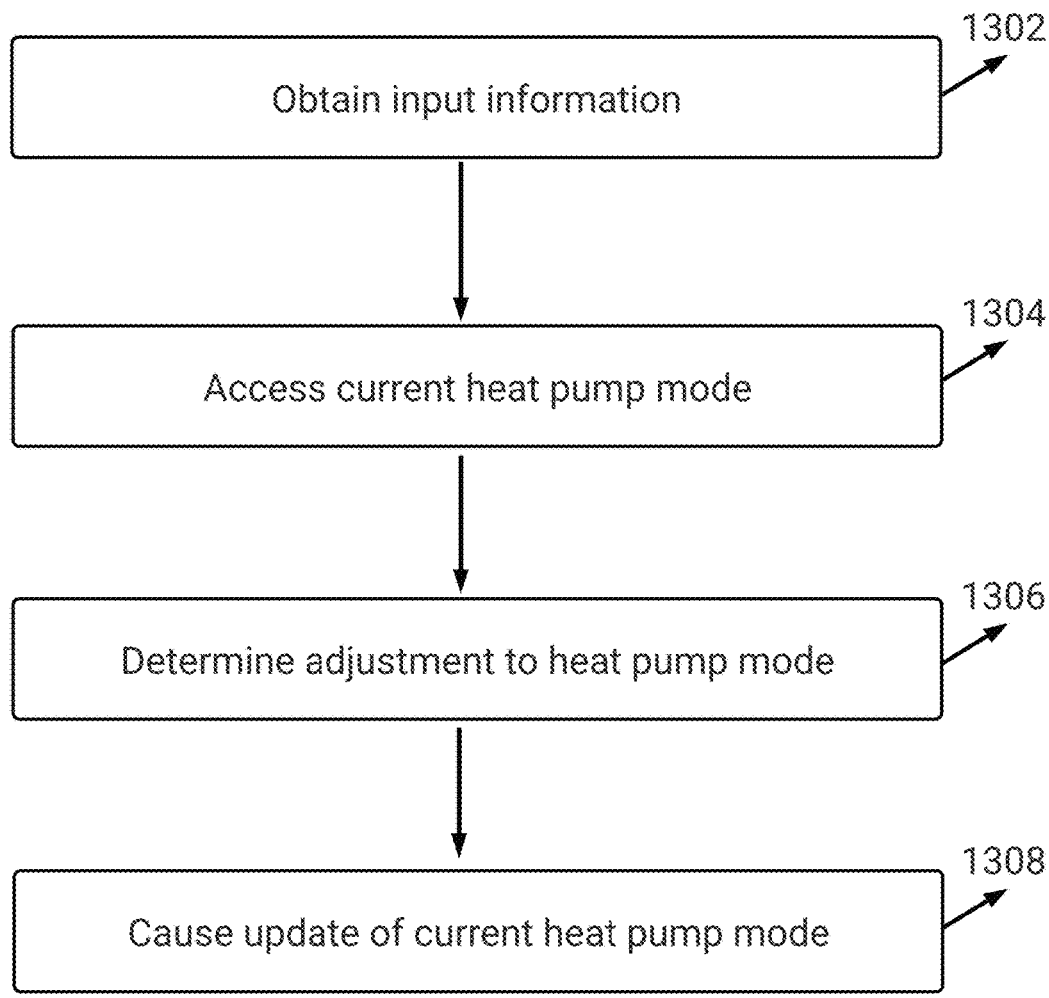
FIG. 13 is a flowchart of an example process to update a heat pump mode by a controller.

FIG. 13 is a flowchart of an example process 1300 to update a heat pump mode by a controller. For convenience, the process 1300 will be described as being performed by a controller (e.g., controller 150).

The process 1300 describes a controller which obtains information and selects heat pump modes. Example information used to select a mode, and example techniques for determining which mode to select, are described in U.S. Patent Pub. 2019/0070924 which is hereby incorporated herein by reference in its entirety.

At block 1302, the controller obtains input information. The input information may represent operational parameters. For example, the parameters may include a current driving mode, whether the vehicle is navigating to a location, a distance until the location, expected weather along the way, locations and distances to chargers, whether the vehicle is charging, and so on. As another example, the input information may represent sensor information. For example, temperature information for different components may be accessed and/or external environment temperature.

At block 1304, the controller accesses information identifying a current heat pump mode. At block 1306, the controller determines adjustment to heat pump mode. For example, the controller may determine an adjustment if the vehicle is charging (e.g., fast charging, such as 75 kW, 150 KW, and so on). In this example, the controller may determine that the battery should be cooled. As another example, the controller may determine that heat from the powertrain should be used to heat an interior of the cabin and/or heat from an external environment.

At block 1308, the system causes update of the heat pump mode. The controller may cause adjustment, such as rotation, of the stemshell to implement the updated heat pump mode. In some embodiments, the controller may store information identifying particular rotations for each heat pump mode. For example, a look up table may be used, and so on.

As an example, during charging the system may select a heat pump mode which causes reversal of coolant flow. For this example, the system may alternate between a first mode (e.g., the mode of FIG. 7 or FIG. 10) and a second mode (e.g., the mode of FIG. 9 or FIG. 12). While reversing coolant flow may be used, for example, during charging, in some embodiments reversing coolant flow may be used for more uniform heating (e.g., preconditioning batteries for charging to heat the battery cells up, or to store thermal energy for heat pump modes).

Figure 14:
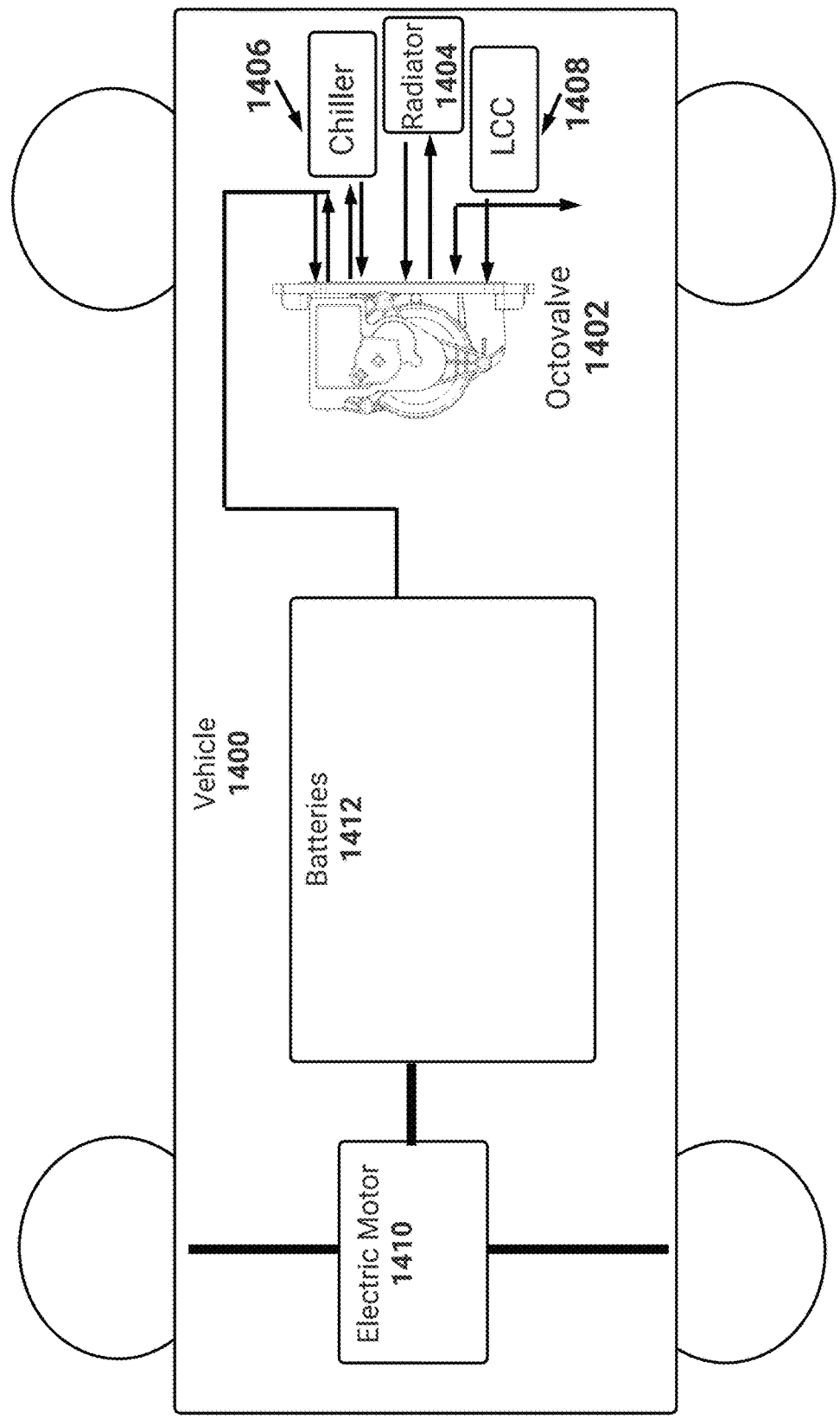
FIG. 14 illustrates an example vehicle which includes the example octovalve.

FIG. 14 illustrates a block diagram of a vehicle 1400. The vehicle 1400 may include one or more electric motors 1410 which cause movement of the vehicle 1400. The electric motors 1410 may include, for example, induction motors, permanent magnet motors, and so on. Batteries 1412 (e.g., one or more battery packs each comprising a multitude of batteries) may be used to power the electric motors 1410 as is known by those skilled in the art.

The vehicle includes an octovalve 1402 which may form part, or all, of a heat pump for the vehicle 1400. The octovalve 1402 may represent the octovalve 100 described above. As illustrated, the octovalve 1402 may include fluidic connections to the batteries 1412, the powertrain (e.g., the motor 1410), a chiller 1406, a radiator 1404, an LCC 1408, and so on.

Example of Two or More Octovalves

FIG. 15 illustrates an example embodiment which includes two octovalves 1510A-1510B. In the illustrated example, there is a battery coolant loop 1502 (e.g., illustrated in a first color, such as green, or first pattern), a refrigerant loop 1504 (e.g., illustrated in a second color, such as blue, or second pattern), and a powertrain coolant loop 1506 (e.g., illustrated in a third color, such as red, or third pattern). In this way, multiple octovalves may be used for different types of cooling. For example, octovalve 1510A controls coolant flow associated with drive units 312 (e.g., powertrain coolant loop 1506) while octovalve 1510B controls coolant flow associated with the battery 310. The refrigerant loop 1504 relates to refrigerant which may be used to exchanged heat with coolant as described herein with respect to the chiller and LCC.

ADDITIONAL EMBODIMENTS

The following is further example description.

The Octovalve may additionally be used to bypass the drive units and reverse flow direction in the battery. Using, as an example, one valve for both functions may save an actuator, wire harness and one hose connection which may be used for two independent valves (3-way and 4-way).

Bypassing (partially or entirely) the drive units while charging may be performed because the drive units may, as an example, not be used when charging (e.g., assuming the battery pack temperature exceeds a threshold). However, the powertrain coolant loop may be used for cooling the high side of the refrigeration loop via the LCC so that the compressor and chiller can continue aggressively cooling the battery pack. Bypassing the drive units may remove a large flow restriction and enable higher rates of coolant flow to the LCC which can improve chiller cooling capacity.

Reversing flow may, as an example, also allow for limiting temperature gradients in the battery pack. For example, battery cells near the inlet may be cooler than cells near the outlet when cooling the pack, for example during charging. Cell electrical impedance may be higher at low temperature, so the cold cells may not charge as much as the hot cells, leading to charge imbalance. Switching the direction of coolant flow (e.g., once or multiple times during charging) may reduce the temperature gradient and therefore the charge imbalance. As another example, during charging, the battery pack charge power may be limited by the hottest battery cell, which may be near the coolant outlet. Switching the direction of flow may reduce the hottest cell temperature and improve charge rate for the battery pack.

The foregoing disclosure is not intended to limit the present disclosure to the precise forms or particular fields of use disclosed. As such, it is contemplated that various alternative embodiments and/or modification to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the octovalve. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Additionally, numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. An apparatus usable as part of a heat pump for an electric vehicle, the apparatus comprising:
   a housing, the housing having a particular number of connection ports, at least one connection port being connected to a component of the electric vehicle, and the connection ports being configured to pass fluid, and wherein the connection ports are oriented in a same direction; and
   a stemshell positioned within the housing, the stemshell comprising a plurality of channels, wherein at least a portion of the channels are in fluidic connection with the connection ports, wherein the stemshell is configured to rotate within the housing, and wherein rotation causes adjustment of the connection ports which correspond to the channels, and wherein the stemshell has a vertical separation, and wherein a subset of the channels are at a first vertical height and a remaining subset are at a second vertical height.

2. The apparatus of claim 1, wherein the particular number of connection ports is greater than or equal to 6.

3. The apparatus of claim 1, wherein the particular number of connection ports is 8.

4. The apparatus of claim 1, wherein there are 6 channels.

5. The apparatus of claim 1, wherein there are four vertical channels and two horizontal channels.

6. The apparatus of claim 1, wherein a controller causes rotation of the stemshell.

7. The apparatus of claim 6, wherein the controller rotates the stemshell to specific orientations which correspond to specific heat pump modes.

8. An apparatus usable as part of a heat pump for an electric vehicle, the apparatus comprising:
   a housing, the housing having a particular number of connection ports, at least one connection port being connected to a component of the electric vehicle, and the connection ports being configured to pass fluid, wherein the particular number is greater than or equal to 6, and wherein the connection ports are oriented in a same direction; and
   a stemshell positioned within the housing, the stemshell comprising a plurality of channels, wherein at least a portion of the channels are in fluidic connection with the connection ports, wherein the stemshell is configured to rotate within the housing, and wherein rotation causes adjustment of the connection ports which correspond to the channels.

9. An apparatus usable as part of a heat pump for an electric vehicle, the apparatus comprising:
   a housing, the housing having a particular number of connection ports, at least one connection port being connected to a component of the electric vehicle, and the connection ports being configured to pass fluid; and
   a stemshell positioned within the housing, the stemshell comprising a plurality of channels, wherein at least a portion of the channels are in fluidic connection with the connection ports, wherein the stemshell is configured to rotate within the housing, and wherein rotation causes adjustment of the connection ports which correspond to the channels, and wherein there are four vertical channels and two horizontal channels.

10. An apparatus usable as part of a heat pump for an electric vehicle, the apparatus comprising:
    a housing, the housing having a particular number of connection ports, at least one connection port being connected to a component of the electric vehicle, and the connection ports being configured to pass fluid; and a stemshell positioned within the housing, the stemshell comprising a plurality of channels, wherein at least a portion of the channels are in fluidic connection with the connection ports, wherein the stemshell is configured to rotate within the housing, and wherein rotation causes adjustment of the connection ports which correspond to the channels;

wherein the apparatus is configured to receive input information indicating that the electric vehicle is charging, and wherein an updated heat pump mode indicates a reversal of coolant flow as compared to a current heat pump mode.

11. An electric vehicle comprising:
a battery pack;
an electric motor; and
an octovalve, the octovalve being usable as part of a heat pump for an electric vehicle, the octovalve comprising:
a housing, the housing having a particular number of connection ports, at least one connection port being connected to a component of the electric vehicle, and the connection ports being configured to pass fluid, and wherein the connection ports are oriented in a same direction; and
a stemshell positioned within the housing, the stemshell comprising a plurality of channels, wherein at least a portion of the channels are in fluidic connection with the connection ports, wherein the stemshell is configured to rotate within the housing, and wherein rotation causes adjustment of the connection ports which correspond to the channels, and wherein the stemshell has a vertical separation, and wherein a subset of the channels are at a first vertical height and a remaining subset are at a second vertical height.

12. The electric vehicle of claim 11, wherein the connections ports are oriented in a same direction.

13. An electric vehicle comprising:
a battery pack;
an electric motor; and
an octovalve, the octovalve being usable as part of a heat pump for an electric vehicle, the octovalve comprising:
a housing, the housing having a particular number of connection ports, at least one connection port being connected to a component of the electric vehicle, and the connection ports being configured to pass fluid, wherein the particular number is greater than or equal to 6, and wherein the connection ports are oriented in a same direction; and
a stemshell positioned within the housing, the stemshell comprising a plurality of channels, wherein at least a portion of the channels are in fluidic connection with the connection ports, wherein the stemshell is configured to rotate within the housing, and wherein rotation causes adjustment of the connection ports which correspond to the channels.

14. An electric vehicle comprising:
a battery pack;
an electric motor; and
an octovalve, the octovalve being usable as part of a heat pump for an electric vehicle, the octovalve comprising:
a housing, the housing having a particular number of connection ports, at least one connection port being connected to a component of the electric vehicle, and the connection ports being configured to pass fluid; and
a stemshell positioned within the housing, the stemshell comprising a plurality of channels, wherein at least a portion of the channels are in fluidic connection with the connection ports, wherein the stemshell is configured to rotate within the housing, and wherein rotation causes adjustment of the connection ports which correspond to the channels, and wherein there are four vertical channels and two horizontal channels.

15. An electric vehicle comprising:
a battery pack;
an electric motor; and
an octovalve, the octovalve being usable as part of a heat pump for an electric vehicle, the octovalve comprising:
a housing, the housing having a particular number of connection ports, at least one connection port being connected to a component of the electric vehicle, and the connection ports being configured to pass fluid; and
a stemshell positioned within the housing, the stemshell comprising a plurality of channels, wherein at least a portion of the channels are in fluidic connection with the connection ports, wherein the stemshell is configured to rotate within the housing, and wherein rotation causes adjustment of the connection ports which correspond to the channels;
wherein the octovalve is configured to receive input information indicating that the electric vehicle is charging, and wherein an updated heat pump mode indicates a reversal of coolant flow as compared to a current heat pump mode.

16. A method implemented by a controller associated with controlling an octovalve configured for use as part of a heat pump for an electric vehicle, the method comprising:
obtaining input information associated with operation of the vehicle;
accessing a current heat pump mode associated with the octovalve, wherein the octovalve includes a stemshell positioned within the octovalve, the stemshell comprising a plurality of channels, wherein at least a portion of the channels are in fluidic connection with connection ports, wherein the stemshell is configured to rotate and cause adjustment of the connection ports which correspond to the channels, wherein the connection ports are oriented in a same direction;
determining adjustment to the heat pump mode based on the input information; and
causing update of the current heat pump mode, wherein the update causes rotation of the stemshell.

17. The method of claim 16, wherein the stemshell has a vertical separation, and wherein a subset of the channels are at a first vertical height and a remaining subset are at a second vertical height.

18. A method implemented by a controller associated with controlling an octovalve configured for use as part of a heat pump for an electric vehicle, the method comprising:
obtaining input information associated with operation of the electric vehicle;
accessing a current heat pump mode associated with the octovalve, wherein the octovalve includes a stemshell positioned within the octovalve, the stemshell comprising a plurality of channels, wherein at least a portion of the channels are in fluidic connection with connection ports, wherein the stemshell is configured to rotate and cause adjustment of the connection ports which correspond to the channels, wherein the octovalve comprises a housing having a particular number of ports, and wherein the particular number is greater than or equal to 6, and wherein the connection ports are oriented in a same direction;

determining adjustment to the heat pump mode based on the input information; and causing update of the current heat pump mode, wherein the update causes rotation of the stemshell.

19. A method implemented by a controller associated with controlling an octovalve configured for use as part of a heat pump for an electric vehicle, the method comprising:

obtaining input information associated with operation of the vehicle;

accessing a current heat pump mode associated with the octovalve, wherein the octovalve includes a stemshell positioned within the octovalve, the stemshell comprising a plurality of channels, wherein at least a portion of the channels are in fluidic connection with connection ports, wherein the stemshell is configured to rotate and cause adjustment of the connection ports which correspond to the channels, and wherein there are four vertical channels and two horizontal channels;

determining adjustment to the heat pump mode based on the input information; and causing update of the current heat pump mode, wherein the update causes rotation of the stemshell.

20. A method implemented by a controller associated with controlling an octovalve configured for use as part of a heat pump for an electric vehicle, the method comprising:

obtaining input information associated with operation of the vehicle;

accessing a current heat pump mode associated with the octovalve, wherein the octovalve includes a stemshell positioned within the octovalve, the stemshell comprising a plurality of channels, wherein at least a portion of the channels are in fluidic connection with connection ports, wherein the stemshell is configured to rotate and cause adjustment of the connection ports which correspond to the channels;

determining adjustment to the heat pump mode based on the input information; and causing update of the current heat pump mode, wherein the update causes rotation of the stemshell, and wherein the input information indicates that the electric vehicle is charging, and wherein an updated heat pump mode indicates a reversal of coolant flow as compared to the current heat pump mode.

* * * * *